US011824184B2

United States Patent
Shin et al.

(10) Patent No.: US 11,824,184 B2
(45) Date of Patent: Nov. 21, 2023

(54) NEGATIVE ELECTRODE ACTIVE MATERIAL, NEGATIVE ELECTRODE INCLUDING THE SAME AND LITHIUM SECONDARY BATTERY INCLUDING THE SAME

(71) Applicant: LG ENERGY SOLUTION, LTD., Seoul (KR)

(72) Inventors: Sun-Young Shin, Daejeon (KR); Dong-Hyuk Kim, Daejeon (KR); Yong-Ju Lee, Daejeon (KR); Rae-Hwan Jo, Daejeon (KR); Je-Young Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/983,280

(22) Filed: Nov. 8, 2022

(65) Prior Publication Data
US 2023/0067691 A1 Mar. 2, 2023

Related U.S. Application Data

(62) Division of application No. 16/642,165, filed as application No. PCT/KR2019/001401 on Jan. 31, 2019.

(30) Foreign Application Priority Data

Jan. 31, 2018 (KR) .................. 10-2018-0012299

(51) Int. Cl.
*H01M 4/1393* (2010.01)
*H01M 4/133* (2010.01)
(Continued)

(52) U.S. Cl.
CPC ......... *H01M 4/131* (2013.01); *H01M 4/0471* (2013.01); *H01M 4/133* (2013.01);
(Continued)

(58) Field of Classification Search
None
See application file for complete search history.

(56) References Cited

U.S. PATENT DOCUMENTS 6,287,378 B1 * 9/2001 Fairchild .................. C01B 33/24
106/796
2016/0226098 A1 8/2016 Yoshida et al.
(Continued)

FOREIGN PATENT DOCUMENTS

CN 101418460 A 4/2009
CN 101533907 A 9/2009
(Continued)

OTHER PUBLICATIONS

Extended European Search Report issued from the European Patent Office dated Nov. 23, 2020 in a corresponding European Patent Application No. 19748397.7.
(Continued)

*Primary Examiner* — Yoshitoshi Takeuchi
(74) *Attorney, Agent, or Firm* — Morgan, Lewis & Bockius LLP

(57) ABSTRACT

Disclosed is a negative electrode active material which includes: a silicon oxide composite including i) Si, ii) a silicon oxide represented by $SiO_x$ (0<x≤2), and iii) magnesium silicate containing Si and Mg; and a carbon coating layer positioned on the surface of the silicon oxide composite and including a carbonaceous material, wherein X-ray diffractometry of the negative electrode active material shows peaks of $Mg_2SiO_4$ and $MgSiO_3$ at the same time and shows no peak of MgO; the ratio of peak intensity, I
(Continued)

$(Mg_2SiO_4)/I\ (MgSiO_3)$, which is intensity I $(Mg_2SiO_4)$ of peaks that belong to $Mg_2SiO_4$ to intensity I $(MgSiO_3)$ of peaks that belong to $MgSiO_3$ is smaller than 1, the peaks that belong to $Mg_2SiO_4$ are observed at $2\theta=32.2\pm0.2°$, and the peaks that belong to $MgSiO_3$ are observed at $2\theta=30.9\pm0.2°$.

9 Claims, 1 Drawing Sheet

(51) Int. Cl.
    *H01M 4/1395* (2010.01)
    *H01M 4/134* (2010.01)
    *H01M 4/131* (2010.01)
    *H01M 4/04* (2006.01)
    *H01M 4/1391* (2010.01)
    *H01M 4/36* (2006.01)
    *H01M 4/38* (2006.01)
    *H01M 10/0525* (2010.01)
    *H01M 4/02* (2006.01)

(52) U.S. Cl.
    CPC ......... *H01M 4/134* (2013.01); *H01M 4/1391* (2013.01); *H01M 4/1393* (2013.01); *H01M 4/1395* (2013.01); *H01M 4/366* (2013.01); *H01M 4/386* (2013.01); *H01M 10/0525* (2013.01); *H01M 2004/027* (2013.01)

(56) References Cited

U.S. PATENT DOCUMENTS

| | | | |
|---|---|---|---|
| 2016/0372753 A1 | 12/2016 | Fukasawa et al. | |
| 2018/0090750 A1* | 3/2018 | Oh | H01M 4/483 |
| 2020/0136137 A1* | 4/2020 | Shin | H01M 4/587 |
| 2020/0168891 A1* | 5/2020 | Shin | H01M 4/622 |
| 2020/0227731 A1* | 7/2020 | Shin | H01M 4/587 |
| 2020/0235383 A1* | 7/2020 | Shin | H01M 4/625 |
| 2020/0295352 A1* | 9/2020 | Oh | H01M 4/625 |
| 2020/0350571 A1* | 11/2020 | Lee | H01M 4/62 |
| 2020/0388833 A1* | 12/2020 | Lee | C01B 33/113 |
| 2021/0111395 A1* | 4/2021 | Shin | H01M 4/134 |
| 2021/0184204 A1* | 6/2021 | Oh | H01M 4/0471 |
| 2022/0020997 A1 | 1/2022 | Lau et al. | |

FOREIGN PATENT DOCUMENTS

| | | | | |
|---|---|---|---|---|
| CN | 105118971 | A | | 12/2015 |
| CN | 106340636 | A | | 1/2017 |
| JP | 2008-108463 | A | | 5/2008 |
| JP | 2010-170943 | A | | 8/2010 |
| JP | 2012-33317 | A | | 2/2012 |
| JP | 2015-230792 | A | | 12/2015 |
| JP | 2017-224600 | A | | 12/2017 |
| KR | 10-1375688 | B1 | | 3/2014 |
| KR | 10-2015-0113771 | A | | 10/2015 |
| KR | 10-1586816 | B1 | | 1/2016 |
| WO | 2015/037323 | A1 | | 3/2015 |
| WO | 2015/145521 | A1 | | 10/2015 |
| WO | 2016/204366 | A1 | | 12/2016 |
| WO | WO-2016204366 | A1 | * | 12/2016 ........ H01M 10/0525 |

OTHER PUBLICATIONS

Office Action issued from the Chinese Patent Office dated Nov. 22, 2021 in corresponding Chinese Patent Application No. 201980006374.5. Note: JP2017-224600-A and KR 10-1586816-B cited therein are already of record.

International Search Report (with partial translation) and Written Opinion issued in corresponding International Patent Application No. PCT/KR2019/001401, dated May 13, 2019.

Office Action issued from the Japanese Patent Office dated Mar. 1, 2021 in corresponding Japanese patent Application No. 2020-505460.

* cited by examiner

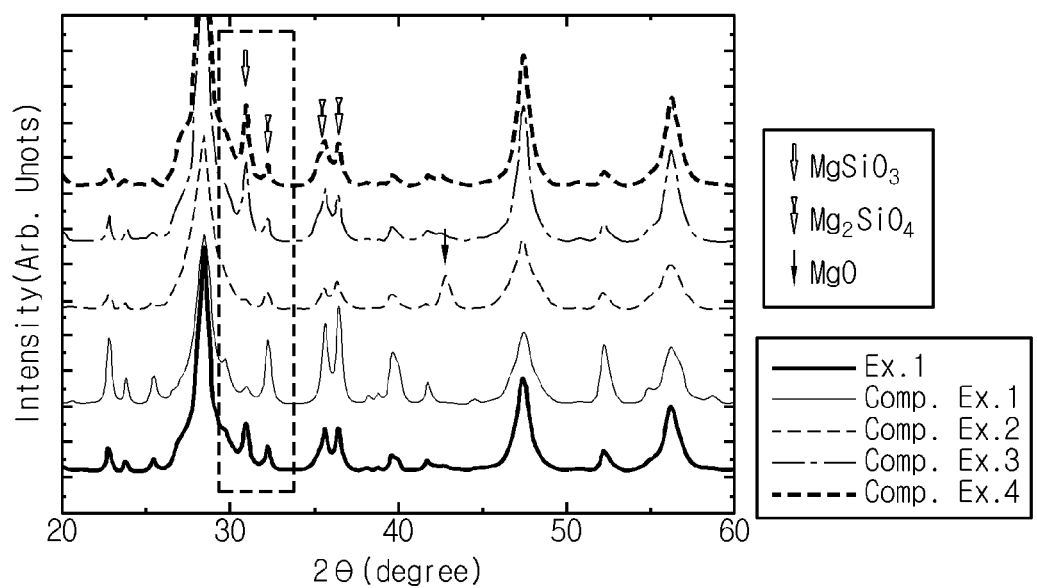

NEGATIVE ELECTRODE ACTIVE MATERIAL, NEGATIVE ELECTRODE INCLUDING THE SAME AND LITHIUM SECONDARY BATTERY INCLUDING THE SAME

TECHNICAL FIELD

The present disclosure relates to a negative electrode active material, and a negative electrode including the same and a lithium secondary battery including the same.

The present application claims priority to Korean Patent Application No. 10-2018-0012299 filed on Jan. 31, 2018 in the Republic of Korea.

BACKGROUND ART

Recently, as mobile instruments, personal computers, electric motors and contemporary capacitor devices have been developed and popularized, high-capacity energy sources have been in increasingly in demand. A typical example of such energy sources includes a lithium secondary battery. Silicon has been given much attention as a negative electrode material for a next-generation type non-aqueous electrolyte secondary battery, since it has a capacity (about 4200 mAh/g) corresponding to about 10 times or more of the capacity (theoretical capacity: 372 mAh/g) of a graphite-based material used conventionally as a negative electrode material. Thus, it has been suggested that silicon, which is alloyed with lithium and shows high theoretical capacity, is used as a novel negative electrode active material substituting for a carbonaceous material.

However, silicon undergoes volumetric swelling during charge and volumetric shrinking during discharge. For this, when a secondary battery is charged/discharged repeatedly, silicon used as a negative electrode active material is micronized and shows an increase in isolated particles that lose a conductive path in the electrode, resulting in degradation of the capacity of a secondary battery.

There has been an attempt to carry out micronization of silicon in order to improve cycle characteristics. As a result, it can be expected that cycle characteristics may be improved as micronization proceeds. However, there is a limitation in reducing the crystallite size of crystalline silicon. Thus, it is difficult to sufficiently solve the problem of micronization of silicon during charge/discharge.

As another method for improving cycle characteristics, use of silicon oxide ($SiO_x$) has been suggested. Silicon oxide ($SiO_x$) forms a structure in which silicon crystals having a size of several nanometers are dispersed homogeneously in silicon oxide, while it is decomposed into Si and $SiO_2$ by disproportionation at a high temperature of 1,000° C. or higher. It is expected that when applying such silicon oxide to a negative electrode active material for a secondary battery, the silicon oxide provides a low capacity corresponding to approximately a half of the capacity of a silicon negative electrode active material but shows a capacity approximately 5 times higher than the capacity of a carbonaceous negative electrode active material. In addition, it shows a small change in volume structurally during charge and discharge to provide excellent cycle life characteristics. However, silicon oxide undergoes reaction with lithium upon the initial charge to produce lithium silicide and lithium oxide (lithium oxide and lithium silicate). Particularly, lithium oxide cannot participate in the subsequent electrochemical reaction and a part of lithium transported to a negative electrode upon the initial charge cannot be returned to a positive electrode, and thus irreversible reaction occurs. In the case of silicon oxide, it shows high irreversible capacity as compared to the other silicon-based negative electrodes and provides a significantly low initial charge efficiency (ICE, ratio of initial discharge capacity to charge capacity) of 70-75%. Such low initial efficiency requires excessive capacity of a positive electrode, when manufacturing a secondary battery, to cause a setoff of the capacity per unit weight of a negative electrode.

Therefore, there still has been a need for developing a silicon oxide-based material which reduces production of lithium oxide causing such irreversibility, when using silicon oxide as a negative electrode active material, and thus can satisfy life characteristics as well as initial capacity/efficiency.

DISCLOSURE

Technical Problem

The present disclosure is directed to providing a negative electrode active material having excellent initial capacity/efficiency and life characteristics, a negative electrode including the same and a lithium secondary battery including the same. These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a negative electrode active material as defined in any one of the following embodiments.

According to the first embodiment, there is provided a negative electrode active material which includes: a silicon oxide composite including i) Si, ii) a silicon oxide represented by $SiO_x$ (0<x≤2), and iii) magnesium silicate containing Si and Mg; and a carbon coating layer positioned on the surface of the silicon oxide composite and including a carbonaceous material, wherein X-ray diffractometry of the negative electrode active material shows peaks of $Mg_2SiO_4$ and $MgSiO_3$ at the same time and shows no peak of MgO, the ratio of peak intensity, I ($Mg_2SiO_4$)/I ($MgSiO_3$), which is intensity I ($Mg_2SiO_4$) of peaks that belong to $Mg_2SiO_4$ to intensity I ($MgSiO_3$) of peaks that belong to $MgSiO_3$ is smaller than 1, the peaks that belong to $Mg_2SiO_4$ are observed at 2θ=32.2±0.2°, and the peaks that belong to $MgSiO_3$ are observed at 2θ=30.9±0.2°, and the negative electrode active material has a water content less than 200 ppm as determined by the Karl-Fischer method at 250° C.

According to the second embodiment, there is provided the negative electrode active material as defined in the first embodiment, wherein the carbon coating layer is present in an amount of 2.5-10 parts by weight based on 100 parts by weight of the silicon oxide composite.

According to the third embodiment, there is provided the negative electrode active material as defined in the first or the second embodiment, wherein Mg is present in an amount of 4-16 wt % based on 100 wt % of the silicon oxide composite.

According to the fourth embodiment, there is provided the negative electrode active material as defined in any one of the first to the third embodiments, wherein the silicon oxide composite powder has an average particle diameter ($D_{50}$) of 0.1-20 μm.

In another aspect of the present disclosure, there is provided a method for preparing a negative electrode active material as defined in any one of the following embodiments.

According to the fifth embodiment, there is provided a method for preparing the negative electrode active material as defined in any one of the first to the fourth embodiments, the method including the steps of:

carrying out reaction of $SiO_x$ (0<x<2) gas with Mg gas and cooling the reaction mixture at 400-900° C. to deposit a silicon oxide composite;

pulverizing the deposited silicon oxide composite; and injecting a carbonaceous material gas to the pulverized silicon oxide composite and carrying out heat treatment at 850-1,150° C. for 30 minutes to 8 hours to form a carbonaceous material-containing coating layer on the surface of the silicon oxide composite.

According to the sixth embodiment, there is provided the method for preparing the negative electrode active material as defined in the fifth embodiment, wherein the $SiO_x$ (0<x<2) gas is prepared by allowing Si and $SiO_2$ to evaporate at 1,000-1,800° C., and the Mg gas is prepared by allowing Mg to evaporate at 800-1,600° C.

According to the seventh embodiment, there is provided the method for preparing the negative electrode active material as defined in the fifth or the sixth embodiment, wherein the reaction of $SiO_x$ (0<x<2) gas with Mg gas is carried out at 800-1,800° C.

According to the eighth embodiment, there is provided the method for preparing the negative electrode active material as defined in any one of the fifth to the seventh embodiments, wherein the carbonaceous material gas is injected to the pulverized silicon oxide composite, and then heat treatment is carried out at 800-1,150° C.

In still another aspect, there is provided a negative electrode as defined in the following embodiment.

According to the ninth embodiment, there is provided a negative electrode including a negative electrode current collector; and a negative electrode active material layer including the negative electrode active material as defined in any one of the first to the fourth embodiments, disposed on at least one surface of the negative electrode current collector.

In yet another aspect, there is provided a lithium secondary battery as define din the following embodiment.

According to the tenth embodiment, there is provided a lithium secondary battery including the negative electrode as defined in the ninth embodiment.

Advantageous Effects

According to the present disclosure, it is possible to provide a negative electrode active material including a silicon oxide-based material which reduces production of lithium oxide causing irreversibility, and thus can provide improved initial capacity and cycle efficiency and realize excellent life characteristics even after charge/discharge for a long time.

In addition, the negative electrode active material according to the present disclosure is provided with a homogeneous carbon coating layer on the outside thereof, and thus shows a reduced water content, thereby providing significantly improved life characteristics.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, the shape, dimension, scale or proportion of an element in the accompanying drawings may be exaggerated for the purpose of clearer description.

FIG. 1 is a graph illustrating the results of X-ray diffractometry of each of the negative electrode active materials according to Example 1 and Comparative Examples 1-4.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part includes an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

The present disclosure relates to a negative electrode for an electrochemical device and an electrochemical device including the same. Herein, the electrochemical device includes any device which carries out electrochemical reaction, and particular examples thereof include all types of primary batteries, secondary batteries, fuel cells, solar cells or capacitors. Particularly, among the secondary batteries, lithium secondary batteries, including lithium metal secondary batteries, lithium ion secondary batteries, lithium polymer secondary batteries or lithium ion polymer batteries, are preferred.

Hereinafter, the negative electrode active material according to the present disclosure will be explained in more detail.

Negative Electrode Active Material

The negative electrode active material according to an embodiment of the present disclosure includes: a silicon oxide composite including i) Si, ii) a silicon oxide represented by $SiO_x$ (0<x≤2), and iii) magnesium silicate containing Si and Mg; and a carbon coating layer positioned on the surface of the silicon oxide composite and including a carbonaceous material, wherein X-ray diffractometry of the negative electrode active material shows peaks of $Mg_2SiO_4$ and $MgSiO_3$ at the same time and shows no peak of MgO, the ratio of peak intensity, I ($Mg_2SiO_4$)/I ($MgSiO_3$), which is intensity I ($Mg_2SiO_4$) of peaks that belong to $Mg_2SiO_4$ to intensity I ($MgSiO_3$) of peaks that belong to $MgSiO_3$ is smaller than 1, the peaks that belong to $Mg_2SiO_4$ are observed at $2\theta=32.2\pm0.2°$, and the peaks that belong to $MgSiO_3$ are observed at $2\theta=30.9\pm0.2°$, and the negative electrode active material has a water content less than 200 ppm as determined by the Karl-Fischer method at 250° C.

The negative electrode active material includes a silicon oxide composite corresponding to a core portion, and a carbon coating layer corresponding to a shell portion partially or totally surrounding the outside of the core portion. The core portion includes a plurality of silicon phases including crystalline silicon, and the silicon phases may be dispersed/distributed homogeneously in a matrix including the Mg-containing silicon oxide composite. According to an embodiment of the present disclosure, the silicon phases may be embedded/buried in the matrix. The silicon phase is a group formed by assemblage of one or more silicon crystals, and a single group may be present or two or more groups may be present. The silicon phase may have a crystallite size of about 15 nm or less. When the crystal size, i.e. crystallite size of the silicon (Si) phase is larger than 15 nm, degradation of life characteristics may be observed.

According to an embodiment of the present disclosure, the silicon oxide composite may have a porous structure having a plurality of pores formed inside of the composite and on the outer surface thereof. The pores may be opened and/or closed and two or more open pores may be interconnected. In addition, ingredients, such as ion, gas and liquid, may pass through the particles through the interconnected pores.

The carbon coating layer corresponding to a shell portion includes a carbonaceous material, which may be bound to, attached to or coated on the surface of the core portion. The carbonaceous material may include at least one selected from the group consisting of crystalline carbon, natural graphite, artificial graphite, graphene, kish graphite, graphitized carbon fibers, graphitized mesocarbon microbeads, and amorphous carbon. In addition, the carbonaceous material may include those obtained by heat treatment or firing of at least one selected from the group consisting of soft carbon, hard carbon, pyrolytic carbon, mesophase pitch based carbon fibers, meso-carbon microbeads, mesophase pitches and petroleum or coal tar pitch derived cokes and activated carbon, at high temperature.

According to an embodiment of the present disclosure, the matrix is an ingredient inactive to Li and causes no Li intercalation/deintercalation during the charge of a battery. Although Si forms a composite with Li to contribute to charge/discharge of a battery, it has a problem of a severe change in volume during charge/discharge. To solve the problem, a negative electrode material using microcrystalline Si or a composite of Si with $SiO_2$ has been developed. However, $SiO_2$ forms $LiO_2$ or Li—S—O during the initial charge to generate irreversible capacity undesirably. Thus, the present disclosure has paid attention to reducing generation of such initial irreversible capacity by incorporating a metal element having binding force equal to or higher than the binding force of Li to oxygen.

According to the present disclosure, the silicon oxide composite includes: i) Si, ii) a silicon oxide represented by $SiO_x$ ($0<x\le2$); and iii) magnesium silicate (Mg-silicate) including Si and Mg. The Mg-silicate includes $Mg_2SiO_4$ and $MgSiO_3$. As a result, the negative electrode active material according to the present disclosure shows peaks of $Mg_2SiO_4$ and $MgSiO_3$ at the same time and shows no peak of MgO, as determined by X-ray diffractometry. When peaks of MgO are further observed, gas generation may occur since MgO reacts with water upon slurry mixing in an aqueous system. Additionally, since MgO is present in a state non-bound (reacted) with $SiO_2$ causing irreversibility, it is not possible to improve initial efficiency sufficiently. Further, there is no effect of inhibiting swelling during Li intercalation/deintercalation, resulting in degradation of battery performance.

In addition, the ratio of peak intensity, I ($Mg_2SiO_4$)/I ($MgSiO_3$), which is intensity I ($Mg_2SiO_4$) of peaks that belong to $Mg_2SiO_4$ to intensity I ($MgSiO_3$) of peaks that belong to $MgSiO_3$ is smaller than 1, wherein the peaks that belong to $Mg_2SiO_4$ are observed at $2\theta=32.2\pm0.2°$, and the peaks that belong to $MgSiO_3$ are observed at $2\theta=30.9\pm0.2°$.

Particularly, the ratio, I ($Mg_2SiO_4$)/I ($MgSiO_3$) may be 0.1-0.9, and more particularly 0.2-0.7. The reason why magnesium silicate, obtained by reaction of SiO with Mg, is used instead of SiO alone is to improve initial efficiency. SiO shows higher capacity as compared to graphite but provides lower initial efficiency. Thus, it is required to increase initial efficiency of SiO in order to increase the capacity of an actual battery to the highest degree. The degree of effect of improving initial efficiency may vary with the amount of Mg bound to $SiO_x$ ($0<x<2$). When the peak intensity ratio, I ($Mg_2SiO_4$)/I ($MgSiO_3$) satisfies the above-defined range, it is possible to form a large amount of $MgSiO_3$ as compared to reaction of SiO with the same amount of Mg, and thus to provide a higher effect of improving initial efficiency as compared to formation of $Mg_2SiO_4$.

The peaks that belong to $Mg_2SiO_4$ are observed at $2\theta=32.2\pm0.2°$, and the peaks that belong to $MgSiO_3$ are observed at $2\theta=30.9\pm0.2°$. Herein, the peaks may be observed through X-ray diffractometry (XRD) using a Cu(Kα-ray) (wavelength: 1.54 Å) source.

Further, the content of the carbon coating layer in the negative electrode active material according to the present disclosure may be 2.5-10 parts by weight, 2.5-7 parts by weight, or 3-5 parts by weight, based on 100 parts by weight of the silicon oxide composite. When the content of the carbon coating layer satisfies the above-defined range, it is possible to cover the silicon oxide composite containing $SiO_x$ suitably to improve electrical conductivity. It is also possible to prevent the silicon oxide composite containing $SiO_x$ (i.e. core) to react with water, and to prevent the problems of degradation of initial capacity and efficiency caused by formation of an excessive amount of carbon coating layer.

In addition, the negative electrode active material according to the present disclosure may have a water content less than 200 ppm, particularly 5-100 ppm, and more particularly 5-50 ppm, as determined by the Karl-Fischer method at 250° C. When the water content satisfies the above-defined range, it is possible to prevent the problems of an increase in resistance caused by an increase in side reactions with an electrolyte when the water content in the negative electrode active material is high, accelerated deterioration of a battery and degradation of life characteristics.

In the silicon oxide composite, Mg, magnesium silicate and silicon oxide are present in such a state that the elements of each phase are diffused so that the boundary surface of one phase is bound to that of another phase (i.e., the phases are bound to each other in an atomic level), and thus undergo little change in volume during lithium ion intercalation/deintercalation and cause no cracking of silicon oxide-based composite particles even after repeating charge/discharge.

According to an embodiment of the present disclosure, Mg may be present in an amount of 4-16 wt %, particularly 4-10 wt %, based on 100 wt % of the silicon oxide composite. When Mg content satisfies the above-defined range, it is possible to improve efficiency while minimizing a decrease in capacity.

According to an embodiment of the present disclosure, the silicon oxide composite powder may have an average particle diameter ($D_{50}$), i.e. the particle diameter at 50% in the volume accumulated particle size distribution of the powder, of 0.1-20 μm, particularly 0.5-10 μm. In addition, the silicon oxide composite powder may have a particle diameter ($D_{90}$) at 90% in the volume accumulated particle size distribution of 30 μm or less, particularly 15 μm or less, and more particularly 10 μm or less. In addition, the silicon oxide composite powder may have the maximum particle diameter in the volume accumulated particle size distribution of 35 μm or less, particularly 25 μm or less. For example, the 50% particle diameter, 90% particle diameter and the maximum particle diameter in the volume accumulated particle size distribution may be obtained from accumulated frequency, as determined by using a currently used laser diffraction particle size distribution analyzer.

Hereinafter, the method for preparing the negative electrode active material according to the present disclosure will be explained.

Method for Preparing Negative Electrode Active Material

The method for preparing a negative electrode active material according to an embodiment of the present disclosure includes the steps of:

carrying out reaction of $SiO_x$ (0<x<2) gas with Mg gas and cooling the reaction mixture at 400-900° C. to deposit a silicon oxide composite;

pulverizing the deposited silicon oxide composite; and injecting a carbonaceous material gas to the pulverized silicon oxide composite and carrying out heat treatment at 850-1,150° C. for 30 minutes to 8 hours to form a carbonaceous material-containing coating layer on the surface of the silicon oxide composite.

According to an embodiment of the present disclosure, the $SiO_x$ (0<x<2) gas may be prepared by allowing Si and $SiO_2$ to evaporate at 1,000-1,800° C., and the Mg gas may be prepared by allowing Mg to evaporate at 800-1,600° C.

The reaction of SiOx (0<x<2) gas with Mg gas may be carried out at 800-1800° C. Then, cooling may be carried out to a target cooling temperature of 400-900° C., particularly 500-800° C., within 1-6 hours. When the cooling time satisfies the above-defined range after the vapor phase reaction of SiOx (0<x<2) gas with Mg gas, such cooling to a low temperature within a short time can solve the problem of insufficient reaction of Mg with SiOx which results in a failure in formation of silicate and a residual undesired phase, such as MgO. Thus, it is possible to significantly improve the initial efficiency and an effect of preventing swelling, thereby providing significantly improved life of a battery.

After cooling, heat treatment may be further carried out, wherein the size of Si crystallites and Mg-silicate proportion may be controlled depending on heat treatment temperature. For example, when the additional heat treatment is carried out at high temperature, $Mg_2SiO_4$ phase may be increased and the Si crystallite size may be increased.

According to an embodiment of the present disclosure, the deposited silicon oxide composite may include a crystalline silicon phase and a matrix in which the silicon phases are scattered, wherein the matrix includes Mg-silicate and silicon-oxide. In addition, it is possible to form the silicon phase and matrix into a size corresponding to microcrystals of about 100 nm by selecting a composition similar to the composition at the eutectic point.

Next, the silicon oxide composite may be pulverized through a mechanical milling process, or the like, to obtain silicon oxide composite powder as a core portion having a particle diameter ($D_{50}$) of 0.1-20 μm. Then, a carbonaceous material gas, such as methane gas, is injected and heat treatment is carried out in a rotary tubular furnace to form a carbon coating layer as a shell portion on the surface of the silicon oxide composite as a core portion. The shell portion includes a carbonaceous material resulting from the heat treatment of the carbonaceous material gas, such as methane. Particularly, the carbon coating layer as a shell portion may be formed by introducing core portion particles to a rotary tubular furnace, increasing the temperature to 800-1,150° C., 900-1,050° C., or 950-1,000° C., at a rate of about 3-10° C./min, or about 5° C./min, and carrying out heat treatment for 30 minutes to 8 hours, while the rotary tubular furnace is rotated and argon gas and the carbonaceous material gas are allowed to flow therethrough, thereby forming the shell portion.

Negative Electrode

The negative electrode according to the present disclosure may be obtained by applying and drying a mixture of a negative electrode active material, a conductive material and a binder on a negative electrode current collector. If desired, the mixture may further include a filler. The negative electrode active material includes the above-described negative electrode material having a core-shell structure.

According to the present disclosure, the current collector is formed to have a thickness of 3-500 μm. The current collector is not particularly limited, as long as it causes no chemical change in the corresponding battery and has high conductivity. Particular examples of the current collector may include stainless steel, aluminum, nickel, titanium, baked carbon, aluminum or stainless steel surface-treated with carbon, nickel, titanium or silver, or the like. A suitable current collector may be selected depending on the polarity of a positive electrode or negative electrode.

The binder is an ingredient which assists binding between the electrode active material and the conductive material and binding to the current collector. In general, the binder is added in an amount of 1-50 wt % based on the total weight of the electrode mixture. Particular examples of the binder include polyacylonitrile-co-acrylate, polyvinylidene fluoride, polyvinyl alcohol, carboxymethyl cellulose (CMC), starch, hydroxypropyl cellulose, regenerated cellulose, polyvinyl pyrrolidone, polytetrafluoroethylene, polyethylene, polypropylene, ethylene-propylene-diene terpolymer (EPDM), sulfonated EPDM, styrene butadiene rubber (SBR), polyacrylic acid, polyacrylic acid substituted with an alkali cation or ammonium ion, poly(alkylene-co-maleic anhydride) substituted with an alkali cation or ammonium ion, poly(alkylene-co-maleic acid) substituted with an alkali cation or ammonium ion, polyethylene oxide, fluororubber, or a combination thereof. More particularly, the polyacrylic acid substituted with an alkali cation or ammonium ion may be exemplified by lithium-polyacrylic acid (Li-PAA, lithium-substituted polyacrylic acid), and the poly(alkylene-co-maleic anhydride) substituted with an alkali cation or ammonium ion may be exemplified by lithium-substituted polyisobutylene-co-maleic anhydride.

The conductive material is an ingredient causing no chemical change in the corresponding battery. Particular examples of the conductive material include: graphite, such as natural graphite or artificial graphite; carbon black, such as carbon black, acetylene black, Ketjen black (trade name), carbon nanotubes, carbon nanofibers, channel black, furnace black, lamp black or thermal black; conductive fibers, such as carbon fibers or metallic fibers; metal powder, such as fluorocarbon, metal powder such as aluminum or nickel powder; conductive whisker, such as zinc oxide or potassium titanate; conductive metal oxide, such as titanium oxide; and conductive materials, such as polyphenylene derivatives.

According to an embodiment of the present disclosure, when manufacturing a negative electrode by applying a mixture of the negative electrode active material, conductive material and the binder on the negative electrode current collector, the negative electrode may be obtained through a dry process by directly applying a solid mixture including the negative electrode active material, conductive material and the binder. Otherwise, the negative electrode may be obtained through a wet process by adding the negative electrode active material, conductive material and the binder to a dispersion medium, followed by agitation, applying the resultant mixture in the form of slurry, and removing the dispersion medium through drying, or the like. Herein, particular examples of the dispersion medium used for a wet process may include an aqueous medium, such as water (deionized water, or the like), or an organic medium, such as N-methyl-2-pyrrolidone (NMP) or acetone.

Lithium Secondary Battery

In another aspect, there is provided a lithium secondary battery including a positive electrode, the negative electrode according to the present disclosure and a separator interposed between the negative electrode and the positive electrode.

The positive electrode may be obtained by applying and drying a mixture of a positive electrode active material, a conductive material and a binder on a positive electrode current collector. If desired, the mixture may further include a filler. Particular examples of the positive electrode active material include, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); $LiMn_2O_4$ in which Li is partially substituted with an alkaline earth metal ion; disulfide compounds; $Fe_2(MoO_4)_3$; or the like.

The conductive material, current collector and the binder used for the positive electrode may refer to those described hereinabove with reference to the negative electrode.

The separator is interposed between the positive electrode and the negative electrode, and may be an insulating thin film having high ion permeability and mechanical strength. In general, the separator may have a pore diameter and thickness of 0.01-10 μm and 5-300 μm, respectively. Particular examples of the separator include: olefinic polymers, such as polypropylene having chemical resistance and hydrophobicity; sheets or non-woven webs made of glass fibers or polyethylene; or the like. Meanwhile, the separator may further include a porous layer containing a mixture of inorganic particles with a binder resin, on the outermost surface thereof.

According to the present disclosure, the electrolyte includes an organic solvent and a predetermined amount of lithium salt. Particular examples of the organic solvent include propylene carbonate (PC), ethylene carbonate (EC), butylene carbonate (BC), diethyl carbonate (DEC), dimethyl carbonate (DMC), dipropyl carbonate (DPC), methyl propionate (MP), dimethyl sulfoxide, acetonitrile, dimethoxyethane, diethoxyethane, tetrahydrofuran, N-methyl-2-pyrrolidone (NMP), ethyl methyl carbonate (EMC), vinylene carbonate (VC), gamma-butyrolactone (GBL), fluoroethylene carbonate (FEC), methyl formate, ethyl formate, propyl formate, methyl acetate, ethyl acetate, propyl acetate, pentyl acetate, methyl propionate, ethyl propionate, butyl propionate, or a combination thereof. In addition, halogen derivatives of the organic solvents and linear ester compounds may also be used. The lithium salt is an ingredient easily soluble in the non-aqueous electrolyte, and particular examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborate, lower aliphatic lithium carboxylate, lithium tetraphenylborate, lithium imides, or the like.

The secondary battery according to the present disclosure may be obtained by receiving and sealing an electrode assembly including positive electrodes and negative electrodes stacked alternatively with separators interposed therebetween in a casing material, such as a battery casing, together with an electrolyte. Any conventional methods for manufacturing a secondary battery may be used with no particular limitation.

In still another aspect, there are provided a battery module including the secondary battery as a unit cell, and a battery pack including the battery module. Since the battery module and battery pack include a secondary battery which shows excellent quick charging characteristics at a high loading amount, they may be used as power sources for electric vehicles, hybrid electric vehicles, plug-in hybrid electric vehicles and power storage systems.

Meanwhile, reference will be made to description about elements used conventionally in the field of a battery, particularly a lithium secondary battery, about other battery elements not described herein, such as a conductive material.

Hereinafter, the present disclosure will be explained in detail with reference to Examples. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

(1) Preparation of Negative Electrode Active Material

Silicon powder and silicon dioxide ($SiO_2$) powder were mixed homogeneously at a molar ratio of 1:1 and the resultant mixture was heat treated at 1,400° C. under reduced pressure atmosphere of 1 torr to prepare with $SiO_x$ (0<x<2) gas, and Mg was heat treated at 900° C. to prepare Mg gas.

The resultant $SiO_x$ (0<x<2) gas and Mg gas were allowed to react at 1,300° C. for 3 hours and then cooled to 800° C. within 4 hours to deposit the product. Then, the resultant product was pulverized by a jet mill to recover Mg-containing silicon oxide composite powder having an average particle diameter ($D_{50}$) of 5 µm.

The recovered silicon oxide composite powder was warmed at a rate of 5° C./min by using a tubular electric furnace and then subjected to chemical vapor deposition (CVD) in the presence of a mixed gas of argon (Ar) with methane ($CH_4$) at 950° C. for 2 hours to obtain a negative electrode active material including a Mg-containing silicon oxide composite having a carbon coating layer thereon. Herein, the content of the carbon coating layer was 5 parts by weight based on 100 parts by weight of the Mg-containing silicon oxide composite.

The negative electrode active material was analyzed by inductive coupled plasma-atomic emission spectroscopy (ICP-AES). It was shown that the negative electrode active material had a Mg concentration of 9 wt %. After carrying out X-ray diffractometry (CuKα), the crystallite size was 9 nm.

(2) Manufacture of Battery

The resultant negative electrode active material:artificial graphite:conductive material (carbon black):carboxymethyl cellulose (CMC):styrene butadiene rubber (SBR) were introduced to water as a dispersion medium at a weight ratio of 9.6:86.4:1:1:2 to prepare negative electrode mixture layer slurry. The negative electrode mixture layer slurry was coated uniformly on both surfaces of copper foil having a thickness of 20 µm. The coating was carried out at a drying temperature of 70° C. and a coating rate of 0.2 m/min. Then, the negative electrode mixture layer was pressed to a porosity of 28% by using a roll press device to accomplish a target thickness. Then, drying was carried out in a vacuum oven at 130° C. for 8 hours to obtain a negative electrode.

Then, 96.7 parts by weight of $Li[Ni_{0.6}Mn_{0.2}Co_{0.2}]O_2$ as a positive electrode active material, 1.3 parts by weight of graphite as a conductive material, and 2.0 parts by weight of polyvinylidene fluoride (PVdF) as a binder were dispersed in 1-methyl-2-pyrrolidone as a dispersion medium to prepare positive electrode mixture layer slurry. The slurry was coated on both surfaces of aluminum foil having a thickness of 20 µm. The coating was carried out at a drying temperature of 80° C. and a coating rate of 0.2 m/min. Then, the positive electrode mixture layer was pressed to a porosity of 24% by using a roll press device to accomplish a target thickness. Then, drying was carried out in a vacuum oven at 130° C. for 8 hours to obtain a positive electrode.

A porous film (30 µm, Celgard) made of polypropylene was interposed between the resultant negative electrode and positive electrode to form an electrode assembly, an electrolyte was injected thereto, and then the electrode assembly was allowed to stand for 30 hours so that the electrolyte might infiltrate into the electrode sufficiently. The electrolyte was prepared by dissolving $LiPF_6$ in an organic solvent containing a mixture of ethylene carbonate with ethylmethyl carbonate at 3:7 (volume ratio) to a concentration of 1.0 M, and adding vinylene carbonate (VC) thereto at a concentration of 2 wt %.

Comparative Example 1

A negative electrode active material was obtained in the same manner as Example 1, except that the carbon coating layer was formed, after cooling was carried out and then additional heat treatment was carried out at 1,200° C., in preparing the Mg-containing silicon oxide composite.

A negative electrode and a secondary battery were obtained in the same manner as Example 1, except that the negative electrode active material obtained as described above was used.

Comparative Example 2

A negative electrode active material was obtained in the same manner as Example 1, except that the cooling step is carried out at 300° C. for 30 minutes after the vapor phase reaction.

A negative electrode and a secondary battery were obtained in the same manner as Example 1, except that the negative electrode active material obtained as described above was used.

Comparative Example 3

A negative electrode active material was obtained in the same manner as Example 1, except that the carbon coating layer was formed at a temperature of 800° C.

A negative electrode and a secondary battery were obtained in the same manner as Example 1, except that the negative electrode active material obtained as described above was used.

Comparative Example 4

A negative electrode active material was obtained in the same manner as Example 1, except that the content of the carbon coating layer was 2 parts by weight.

A negative electrode and a secondary battery were obtained in the same manner as Example 1, except that the negative electrode active material obtained as described above was used.

Test Examples

Test Example 1: X-Ray Diffractometry (XRD)

Each of the negative electrode active materials according to Example 1 and Comparative Examples 1-4 was analyzed by XRD using a Cu(Kα) source (wavelength: 1.54 Å). The analysis results are shown in FIG. 1, and the types of crystalline peaks determined from the analysis are shown in the following Table 1.

Referring to FIG. 1, the peaks that belong to $Mg_2SiO_4$ are observed at 2θ=32.2 0.2°, and the peaks that belong to $MgSiO_3$ are observed at 2θ=30.9±0.2°. Herein, the value of I ($Mg_2SiO_4$)/I ($MgSiO_3$), which is intensity I ($Mg_2SiO_4$) of peaks that belong to $Mg_2SiO_4$ to intensity I ($MgSiO_3$) of peaks that belong to $MgSiO_3$, is shown in Table 1.

Target: Cu(Kα ray) graphite monochromation device
Slit: divergence slit=1°, reception slit=0.1 mm, scattering slit=1°

Test Example 2: Determination of Water Content

Each of the negative electrode active materials according to Example 1 and Comparative Examples 1-4 was determined for water content.

The water content was determined by using a Karl-Fischer water content analyzer (device for determining a trace amount of water available from Mitsubishi Chemical Analytic Co., CA-200). Herein, 1 g of each of the negative electrode active materials according to Example 1 and Comparative Examples 1-4 was used and treated at a temperature of 250° C. to determine its water content by the Karl-Fischer titration method (coulometric titration). The test results are shown in the following Table 1.

Test Example 3: Life Characteristics (Capacity Maintenance (%) after 50 Cycles)

Each of the batteries according to Example 1 and Comparative Examples 1-4 was charged at 0.1-C rate in a constant current (CC)-constant voltage (CV) mode (charged with a constant voltage of 4.2V, 0.05C cut off) at room temperature (25° C.), and discharged at 0.1 C-rate in a CC mode (2.5V cut off). The above procedure was repeated twice. Then, each battery was charged at 0.5 C-rate in a CC-CV mode (charged with a constant voltage of 4.2V, 0.05C cut off) and discharged at 0.5C-rate in a CC mode (2.5V cut off). The above procedure was repeated 48 times. Then, capacity maintenance was determined according to the following formula. The results are shown in the following Table 1.

Capacity maintenance (%)=[Discharge capacity at the $50^{th}$ cycle/Discharge capacity at the $2^{nd}$ cycle]×100

TABLE 1

| | Types of crystalline peaks determined from XRD | Water content (ppm) | Capacity maintenance after 50 cycles (%) | Value of I(Mg$_2$SiO$_4$)/ I(MgSiO$_3$) |
|---|---|---|---|---|
| Ex. 1 | Si, MgSiO$_3$, Mg$_2$SiO$_4$ | 16 | 91.3 | 0.42 |
| Comp. Ex. 1 | Si, MgSiO$_3$, Mg$_2$SiO$_4$ | 17 | 87.7 | 2.32 |
| Comp. Ex. 2 | Si, MgO, MgSiO$_3$, Mg$_2$SiO$_4$ | 21 | 85.4 | 5.37 |
| Comp. Ex. 3 | Si, MgSiO$_3$, Mg$_2$SiO$_4$ | 950 | 75.9 | 0.18 |
| Comp. Ex. 4 | Si, MgSiO$_3$, Mg$_2$SiO$_4$ | 1,380 | 67.8 | 0.14 |

Referring to Table 1, the negative electrode active material according to Example 1 shows peaks of Mg$_2$SiO$_4$ and MgSiO$_3$ at the same time and shows no peak of MgO. In addition, it can be seen that since it has a water content less than 200 ppm and a value of I (Mg$_2$SiO$_4$)/I (MgSiO$_3$) less than 1, the secondary battery using the negative electrode active material according to Example 1 for a negative electrode has a significantly higher capacity maintenance and thus shows excellent life characteristics, as compared to the secondary batteries using a negative electrode active material which does not satisfy at least one of the above-mentioned conditions according to Comparative Examples 1-4.

As described above, the reason why the silicon oxide composite is coated with a carbonaceous material is to improve electrical conductivity of the silicon oxide composite through the coating with a carbonaceous material, since the silicon oxide composite has poor electrical conductivity, and to prevent side reactions with water, since the silicon oxide composite easily reacts with water. In the case of Comparative Example 4, the content of the carbon coating layer is 2 parts by weight, which is smaller than the content of the carbon coating layer in the negative electrode active material according to the present disclosure. As a result, it can be seen that the carbon coating layer cannot cover the silicon oxide composite sufficiently, and thus the silicon oxide composite positioned at the core of the negative electrode active material easily reacts with water to cause deterioration, when mixing and coating are carried out in an aqueous system, such as SBR/CMC, applied to manufacture of a negative electrode. It can be also seen that the battery using the negative electrode active material according to Comparative Example 4 shows significantly low performance.

What is claimed is:

1. A method for preparing a negative electrode active material comprising:
    preparing a SiO$_x$ (0<x<2) gas,
    preparing a Mg gas,
    mixing the SiO$_x$ (0<x<2) gas and the Mg gas to prepare a reaction mixture and carrying out a reaction of the SiO$_x$ (0<x<2) gas with the Mg gas,
    cooling the reaction mixture at 400-900° C. and depositing a silicon oxide composite;
    pulverizing the deposited silicon oxide composite; and
    injecting a carbonaceous material gas into the pulverized silicon oxide composite and carrying out a heat treatment at 800-1,150° C. for 30 minutes to 8 hours to form a carbonaceous material-containing coating layer on a surface of the silicon oxide composite,
    wherein the SiO$_x$ gas and the Mg gas are prepared separately.

2. The method according to claim 1, wherein the SiO$_x$ (0<x<2) gas is prepared by evaporating a mixture of Si and SiO$_2$ at 1,000-1,800° C., and the Mg gas is prepared by evaporating Mg at 800-1,600° C.

3. The method according to claim 1, wherein the reaction of the SiO$_x$ (0<x<2) gas with the Mg gas is carried out at 800-1,800° C.

4. The method according to claim 1, wherein, in injecting the carbonaceous material gas, the carbonaceous material gas is injected to the pulverized silicon oxide composite, and then the heat treatment is carried out at 900-1,050° C.

5. The method according to claim 1, wherein the reaction mixture is cooled at 500-800° C.

6. The method according to claim 1, wherein the cooling is conducted within 1-6 hours.

7. The method according to claim 1, wherein the heat treatment is conducted at 900-1,050° C. to form the carbonaceous material-containing coating layer.

8. The method according to claim 1, wherein the heat treatment is conducted at 950-1,000° C. to form the carbonaceous material-containing coating layer.

9. The method according to claim 1, wherein the heat treatment is conducted by increasing the temperature at a rate of 3-10° C./min to form the carbonaceous material-containing coating layer.

* * * * *